United States Patent [19]

Cunningham

[11] 4,443,776
[45] Apr. 17, 1984

[54] ROTARY MAGNET DEVICE

[76] Inventor: David J. Cunningham, 2508 Barnhart, Fort Wayne, Ind. 46805

[21] Appl. No.: 522,339

[22] Filed: Aug. 10, 1983

[51] Int. Cl.$^3$ .............................................. H01F 7/02
[52] U.S. Cl. ................................... 335/302; 335/306; 310/268
[58] Field of Search ................. 335/302, 306; 310/40, 310/46, 126, 154, 156, 264, 268

[56] References Cited

U.S. PATENT DOCUMENTS

| | | |
|---|---|---|
| 3,293,466 | 12/1966 | Henry-Baudot . |
| 3,867,656 | 2/1975 | Mitsui et al. . |
| 3,899,703 | 8/1975 | Kinnison . |
| 3,984,711 | 10/1976 | Kordik ............................ 310/154 X |
| 4,023,057 | 5/1977 | Meckling ............................ 310/154 |
| 4,074,153 | 2/1978 | Baker et al. . |
| 4,151,431 | 4/1979 | Johnson . |
| 4,237,396 | 12/1980 | Blenkinsop et al. . |
| 4,242,608 | 12/1980 | Ishigaki et al. . |

Primary Examiner—George Harris
Attorney, Agent, or Firm—Jeffers, Irish & Hoffman

[57] ABSTRACT

A rotary magnet device comprises at least two circular arrays of wedge-shaped magnetized elements which are angularly adjustable about their respective radial axes. The elements of each array are arranged in surface-to-surface facing relationship with surfaces of one polarity facing surfaces of opposite polarity, thereby creating a magnetic field about a respective array. Rotary motion is created when the magnetic fields of the respective arrays are brought together to interact. The rate and direction of and torque created by rotation can be selectively varied by angularly adjusting the magnetized elements relative to their radial axes.

14 Claims, 5 Drawing Figures

ROTARY MAGNET DEVICE

BACKGROUND OF THE INVENTION

This invention pertains to a magnet device, and more particularly to a rotary magnet device.

Many devices or apparatuses exist which utilize one or more magnetic fields to produce linear, reciprocative, or rotary motion, and it is to be expected that certain features accompanying each device or apparatus can be less than desirable in its function or presence. Some of these features are a varying magnetic field strength, an excess number of moving or stationary parts, varying magnetic polarity, and magnetic field force vectors that vary in strength and direction. Of course, some of these features can be necessary to the operation of the device or apparatus, but still may pose undesirable effects.

Some prior art devices produce motion by varying the polarity of the magnetic field in a defined area. Generally, this is accomplished by interchanging magnetic pieces of opposite polarity by means of some kind of actuating assembly. The necessity of removing one magnetic piece and replacing it with another magnetic piece of opposite polarity by means of an actuating assembly presents the undesirable possibility of the device becoming inoperative, or the likelihood of unscheduled maintenance due to the actuating assembly.

Still other devices produce motion by varying the strength of the magnetic field while keeping polarities constant. These types of prior art devices would appear to operate more efficiently if the magnetic field strengths could be maintained constant. Further, varying the strength of the magnetic field can be accompanied by variances in directions and magnitudes of the magnetic field force vectors, thereby effecting the operation of the device.

SUMMARY OF THE INVENTION

The present invention provides a rotary magnet device having three unique features. The first is substantially uniform polarity about the arc of travel of the device Although the magnetic field polarity may vary radially, it remains substantially constant circumferentially relative to the device of the present invention.

The second unique feature is a substantially constant or uniform magnetic field strength peripherally about the device. As with the polarity, the magnetic field strength varies radially, but is substantially uniform about the peripheral regions of the device.

The third feature of uniqueness is the substantially constant angular orientation of magnetic field force vectors relative to the device. The combination of these three features in the present invention eliminates undesirable aspects of the above prior art devices.

The device generally comprises two closed-shaped arrays of magnetized elements. Each element is individually permanently magnetized with opposite surfaces of opposite polarity. In each of the arrays, the magnetized elements are oriented relative to adjacent elements so that surfaces of opposite polarity face together, and the elements are angularly oriented relative to the plane of a respective array so that portions of surfaces of like polarity face toward one side of the plane and portions of surfaces of polarity opposite to the first-mentioned surfaces are oriented to the other side of the array, thereby creating a magnetic field about each array.

When the two arrays are axially brought together to interact their respective magnetic fields, one or both of the arrays is caused to rotate. The rotation can be caused by repulsive forces between sides of the arrays of like polarity, or can be caused by attractive forces between sides of the arrays of opposite polarity. Moreover, the magnetized elements of both of the arrays can be angularly adjusted relative to their respective planes to vary the characteristics of the magnetic fields, thereby varying rotational effects. For example, the magnetized elements of one array may be angularly adjusted to peripherally align their respective surfaces to substantially eliminate the creation of a magnetic field, thereby preventing rotation. Alternately, the magnetized elements of the array can be angularly adjusted to maximize the exposure of surfaces to thereby maximize the characteristics of the magnetic field to increase rotational effects. Rotational effects can be rate of rotation, amount of torque created, and the like.

In one form of the invention, there is provided a magnetic device comprising a first array of magnetized elements wherein each magnetized element has opposite surfaces of opposite polarity, and the surfaces of the elements are disposed in surface-to-surface facing relationship with adjacent ones of other magnetized elements such that each surface is facing another surface of opposite polarity. The magnetized elements are angularly disposed relative to the plane of the array to expose first portions of the surfaces of like polarity to one side of the plane of the array and other portions of polarity opposite to the first-mentioned portions on the other side of the array, thereby creating a magnetic field about the array.

A second array similar to the first is likewise provided, and when the two arrays are brought together, at least one of the arrays is rotatable when the magnetic fields interact with each other.

It is an object of the present invention to provide a rotary magnet device having substantially uniform polarity about the arc of travel.

Another object of the present invention is to provide a rotary magnet device having substantially uniform magnetic field strength.

Yet another object of the present invention is to provide a rotary magnet device wherein the magnetic field force vectors are substantially uniformly oriented angularly relative to the arc of travel.

Further objects of the present invention will appear as the description precedes.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

DETAILED DESCRIPTION

Figure 1:
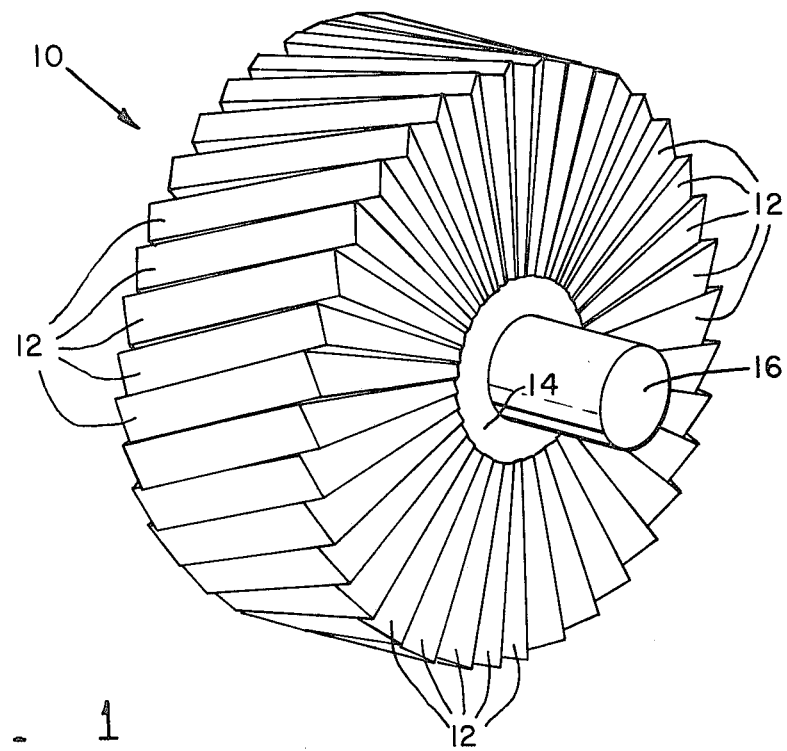
FIG. 1 is a perspective view of one array of magnetized elements.
Figure 2:
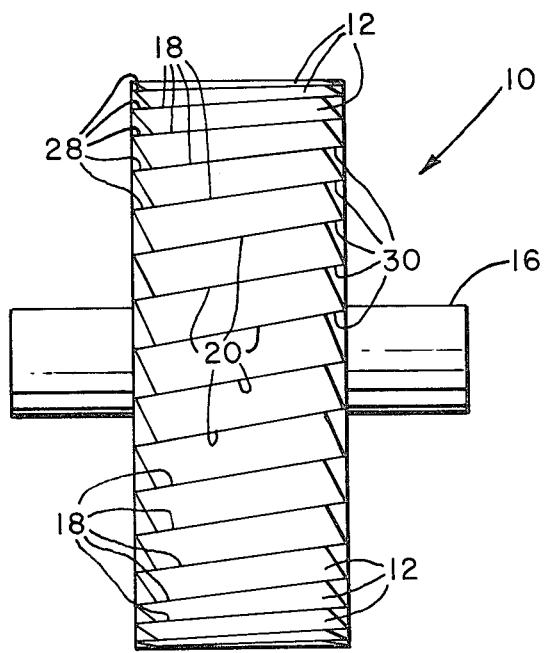
FIG. 2 is a side edge elevational view of the array in FIG. 1.
Figure 3:
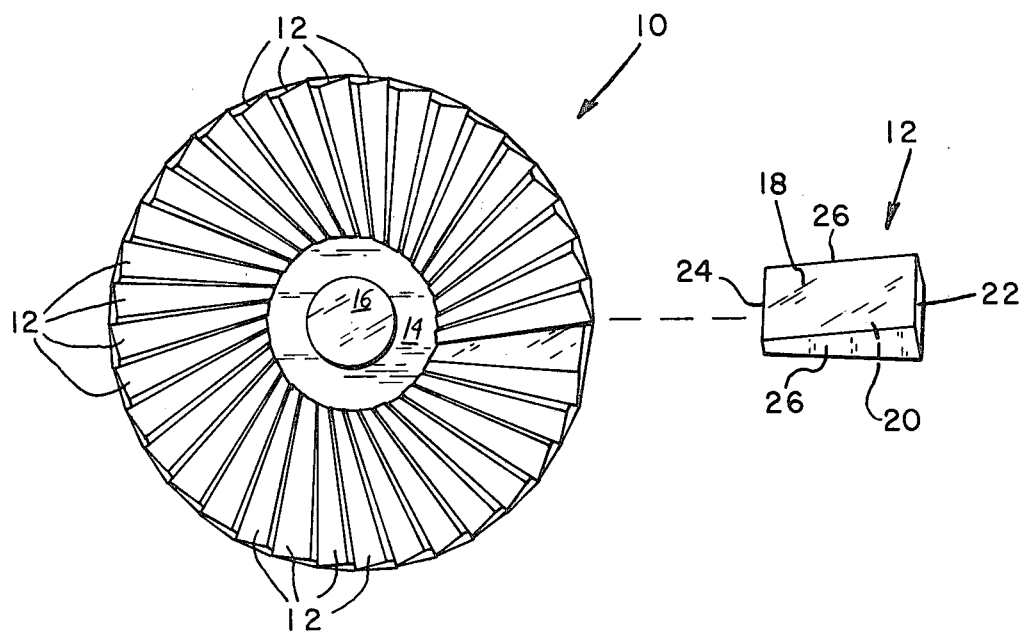
FIG. 3 is a side surface elevational view of the array of FIG. 1 with one of the magnetized elements spaced slightly therefrom.

Referring to FIGS. 1-3, array 10 comprises a plurality of wedge-shaped magnetized elements 12 circularly disposed about and connected to collar 14. Shaft 16 is axially received through collar 14, and collar 14 may either rotate relative to shaft 16 or may be secured to shaft 16 to rotate therewith as described hereinafter. Each magnetized element comprises opposite surfaces 18, 20, top 22, bottom 24, and edges 26. Each element 12 is magnetized such that surfaces 18 and 20 are of opposite polarity, and the plurality of magnetized elements 12 are arranged in array 10 such that surfaces 18, 20 of one magnetized element 12 abut respective surfaces 20, 18 of adjacent magnetized elements 12. Important to the invention is that the abutting surfaces are of opposite polarity. For example, if surfaces 18 are North poles and surfaces 20 are South poles, then surface 18 of one element 12 will abut surface 20 of another element 12 to create a magnetic field about array 10.

Magnetized elements 12 are further circularly disposed about collar 14 in an angular fashion by angularly adjusting elements 12 about their respective radial axes. By doing so, portions 28 of surfaces 18 are exposed to one side of the plane of array 10, and portions 30 of surfaces 20 are exposed to the opposite side of the plane of array. This provides array 10 with sides of opposite polarity to thereby create a magnetic field peripherally thereabout. Further, the magnetic field does not lie totally within the plane of array 10, nor is the magnetic field parallel to the plane. Rather, the magnetic field is angularly disposed relative to the plane of array 10.

Thusly described, array 10 has three unique magnetic characteristics. One of the unique characteristics is substantially uniform polarity about the peripheral regions of array 10. By this is meant that although the polarity varies radially, it is substantially constant or uniform about the peripheral or circumferential regions of array 10. A second unique magnetic characteristic of array 10 is that the magnetic field strength is substantially uniform peripherally, and a third unique magnetic characteristic is the substantially uniformly angularly oriented magnetic field force vectors about array 10. These three characteristics are derived from the angular orientation of elements 12 about collar 14 wherein portions 28, 30, which are of opposite polarity, are equally exposed to opposite sides of the plane of array 10.

Figure 4:
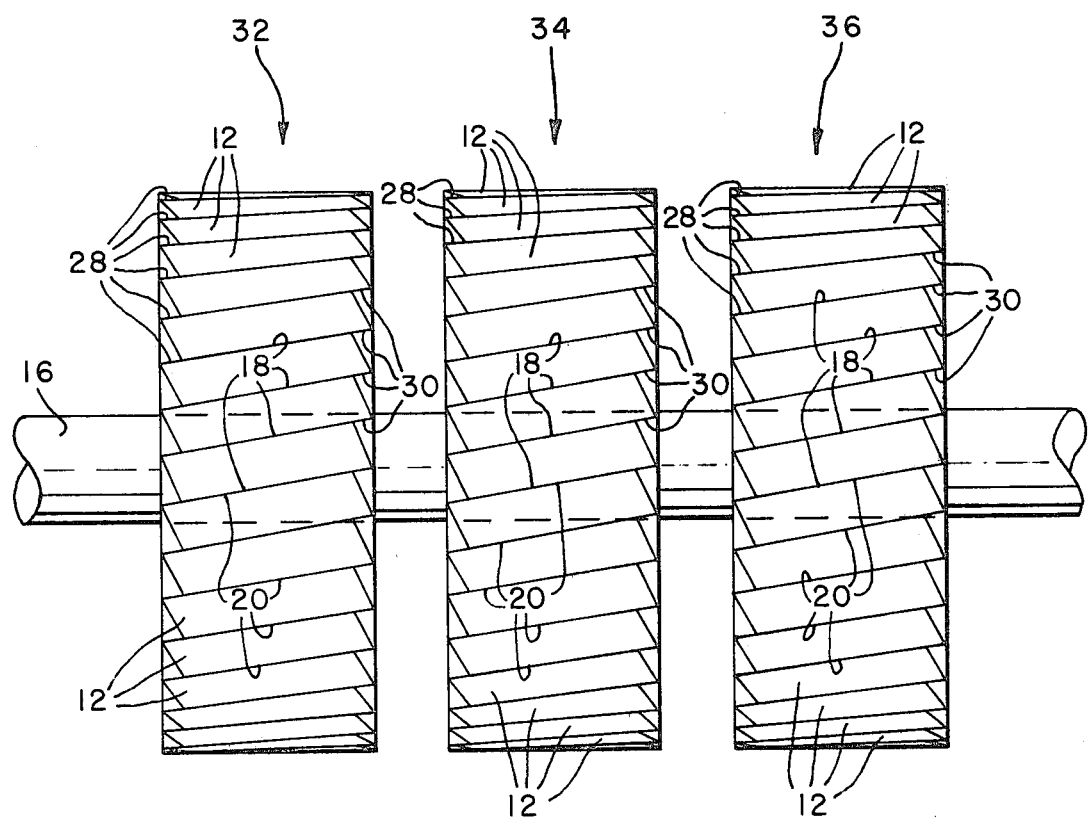
FIG. 4 is a side edge elevational view of three arrays of one embodiment of the present invention.

Referring now to FIG. 4, there are 3 arrays 32, 34, 36, similar to array 10, with shaft 16 axially received therethrough. Looking only at the arrays 34, 36, shaft 16 is secured to array 34 to rotate therewith and is rotatably received through array 36. Magnetized elements 12 of array 36 are angularly adjusted to expose portions 28 of surfaces 18 generally toward array 34, and portions 30 of surfaces 20 of array 34 are angularly adjusted generally facing toward array 36, thereby creating attractive forces between portions 28 and portions 30. When arrays 34, 36 are coaxially moved together to interact there respective magnetic fields, the attractive forces will cause array 34 to rotate relative to stationary array 36.

The rotary motion is due to the angular orientation of elements 12 to the plane of their respective array, which causes the magnetic field to be accordingly angularly disposed to the plane. The magnetic field force vectors, also being angularly disposed to the plane, have two components. One of the components is substantially axially oriented, and the second is substantially tangentially oriented. With the arrays being fixed in axial spaced-apart relation, the axial components are made ineffective. However, the tangential components are effective to cause rotation.

Continuing to refer to FIG. 4, stationary array 32 can be coaxially moved towards array 34 to interact their respective magnetic fields to provide either repulsive or attractive forces between stationary array 32 and array 34 to create a second rotating force on array 34.

A magnetic field created by magnetized elements 12 of any one array 10, 32, 34, 36 can be varied by angularly adjusting magnetized elements 12 between a first position wherein the elements 12 are peripherally aligned to substantially eliminate the magnetic field and a second position wherein elements 12 are angularly adjusted to expose maximum portions 28, 30 of surfaces 18, 20, respectively. For example, in FIG. 4, magnetized elements 12 of array 34 can be angularly adjusted to peripherally align its magnetized elements 12 to substantially eliminate its magnetic field. This terminates any magnetic field interaction between array 34 and arrays 32, 36 to prevent rotation of array 34. By angularly adjusting elements 12 in array 34, its magnetic field can be provided with varying magnetic characteristics to thereby vary the interaction with the magnetic fields of arrays 32, 36, the rate of rotation of array 34 and the torque created thereby.

Viewing only arrays 34, 36 in FIG. 4, the direction of rotation of array 34 can be reversed by angularly adjusting respective magnetized elements 12 of arrays 34, 36 past their planes, thereby changing the polarity about arrays 34, 36.

Magnetized elements 12 can be angularly adjusted in any suitable manner, for example, by a bevel gear, worm gear, or like arrangement axially disposed in a hollow shaft 16. Magnetized elements 12 of a stationary array can alternately be angularly adjusted by a similar gear arrangement operatively connected to the peripheral portions of elements 12.

Figure 5:
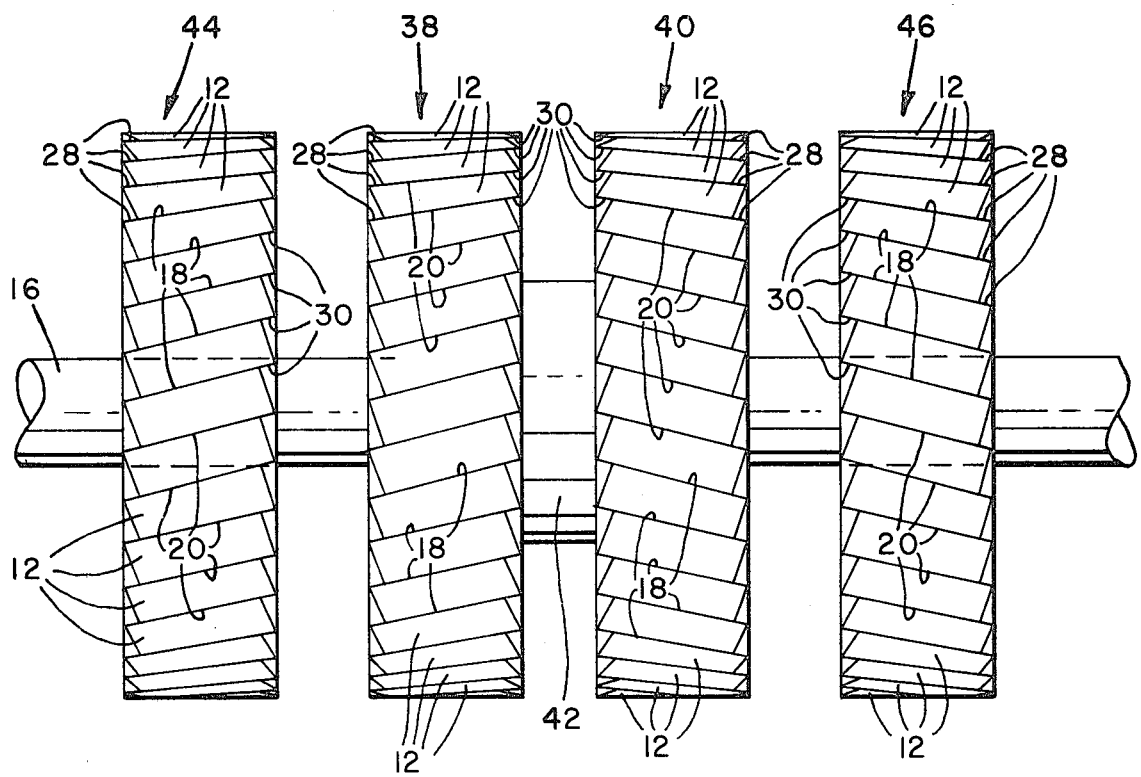
FIG. 5 is a side edge elevational view of another embodiment of the present invention.

Referring now to FIG. 5, a modification of the present invention is illustrated wherein rotatable arrays 38, 40 are connected together by non-magnetic member 42, and shaft 16 is axially disposed through and connected to arrays 38, 40 to rotate therewith. Stationary arrays 44, 46 are disposed on opposite sides of arrays 38, 40 as illustrated to create interacting magnetic fields between arrays 38 and 44 and arrays 40 and 46. FIG. 5 illustrates magnetized elements 12 of arrays 38, 44 being angularly adjusted in a parallel manner, and magnetized elements 12 of arrays 40, 46 being angularly adjusted in a parallel manner but different from that of elements 12 in arrays 38, 44. For exemplary purposes only, assuming portions 30 of surfaces 20 are magnetized so as to be South poles, and portions 28 of surfaces 18 are magnetized to be North poles, the interaction of the magnetic fields between arrays 38, 44 cause array 38 to rotate from top to bottom as viewed in FIG. 5, and the interacting magnetic fields between arrays 40, 46 likewise cause array 40 to rotate from top to bottom. By angularly adjusting magnetic elements 12 in all of the arrays 38, 40, 44, 46, the rate and direction of rotation of and torque created by arrays 38, 40 can be selectively varied.

The rotary motion created by the present invention can be used as such to drive another device or apparatus requiring rotary motion, or can be translated to linear motion for use. The linear motion can be reciprocative by angularly adjusting magnetized elements 12 through the plane of their respective array to thereby reverse the direction of rotation. Further, it is contemplated that electrical current can be generated for use by the rotating magnetic field.

Although the above description refers to a circular array of magnetized elements 12, elements 12 may be arranged in any geometric closed shaped, such as an oval shape or polygon shape. Further, should the effect of any magnetic field tend to decrease, selected ones of magnetized elements 12 may be removed and an induction coil may be inserted therefor to reestablish the strength of the magnetic field. Finally, the arrays of elements 12 can be replaced by solid generally ring-shaped members. The ring-shaped members can then be magnetized at an angle to their respective planes, i.e., the magnetic fields are angularly disposed relative to respective planes, and, when brought together to interact respective magnetic fields, cause rotation of one or more such members.

While this invention has been described as having a preferred embodiment, it will be understood that it is capable of further modifications. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A magnet device, comprising:
a first substantially circular array of magnetized elements, each said magnetized element having opposite surfaces of opposite polarity and being disposed in surface-to-surface facing relationship with adjacent ones of said magnetized elements such that each said surface of each said magnetized element is in facing relationship with a respective said surface of opposite polarity of an adjacent said magnetized element, said magnetized elements being angularly disposed about respective radial axes relative to the plane of said first array to expose first portions of said surfaces of like polarity to one side of said plane and second portions of polarity opposite to said first portions on the other side of said plane, thereby creating about said first array a magnetic field having substantially uniform polarity, substantially uniform field strength, and substantially uniformly, angularly oriented magnetic field force vectors, and a second substantially circular array of other said magnetized elements being substantially coaxially disposed relative to said first array, each said other magnetized element having opposite surfaces of opposite polarity and being disposed in surface-to-surface facing relationship with adjacent ones of said other magnetized elements such that each said surface of each said other magnetized element is in facing relationship with a respective said surface of opposite polarity of adjacent said other magnetized element, said other magnetized elements being angularly disposed about respective radial axes relative to the plane of said second array to expose first portions of said surfaces of like polarity to one side of said plane and second portions of polarity opposite to said first portions on the other side of said plane, thereby creating about said second array a magnetic field having substantially uniform polarity, substantially uniform field strength, and substantially uniformly angularly oriented magnetic field force vectors, one of said first array and said second array being rotatable relative to the other of said first array and said second array when portions of their respective said magnetic fields interact with each other.

2. The device of claim 1 wherein said portions of said magnetic fields interacting with one another are of like polarity to rotate said one of said first array and said second array by the repulsive forces therebetween.

3. The device of claim 1 wherein said portions of said magnetic fields interacting with one another are of opposite polarity to rotate said one of said first array and said second array by the attractive forces therebetween.

4. The device of claim 1 wherein said magnetized elements of said first array are angularly adjustable about their respective radial axes to selectively vary the amount of exposure of said first portions and said second portions of said magnetized elements, thereby varying the interaction between said magnetic field portions and thusly the rate of rotation of and torque created by said one of said first array and said second array.

5. The device of claim 1 wherein said other magnetized elements of said second array are angularly adjustable about their respective radial axes to selectively vary the amount of exposure of said first portions and said second portions of said other magnetized elements, thereby varying the interaction between said magnetic field portions and thusly the rate of rotation of and torque created by said one of said first array and said second array.

6. The device of claim 1 wherein said magnetized elements and said other magnetized elements are selectively adjustable to reverse the sides of exposure relative to their respective said planes of respective said first portions and respective said second portions, thereby reversing polarity to reverse the direction of rotation.

7. The device of claim 1 wherein said magnetized elements and said other magnetized elements are wedge-shaped and have their respective said surfaces in abutment with respective said surfaces of adjacent said magnetized elements and adjacent said other magnetized elements, respectively.

8. The device of claim 1 further including a plurality of said first arrays being substantially coaxially disposed alternately with a plurality of said second arrays, and a shaft member connected to said one of said first array and said second array for rotation therewith when said magnetic fields interact.

9. A rotary magnetic device, comprising:
a first plurality of magnetized elements having respective opposite surfaces of opposite polarity and being disposed in a first plane about an axis in substantially surface-to-surface facing relationship such that facing ones of said surfaces are of opposite polarity, said magnetized elements being angularly disposed relative to said first plane to expose first portions of said surfaces of like polarity to one side of said first plane and second portions of polarity opposite to said first portions on the other side of said first plane to thereby create a magnetic field about said first plurality of magnetized elements, and a second plurality of magnetized elements having respective opposite surfaces of opposite polarity and being disposed in a second plane about an axis in substantially surface-to-surface facing relationship such that facing ones of said surfaces are of opposite polarity, said second plurality of magnetized elements being angularly disposed relative to said second plane to expose first portions of said surfaces of like polarity to one side of said second plane and second portions of polarity opposite to said first portions on the other side of said second plane, thereby creating a magnetic field about said second plurality of magnetized elements, one of said first plurality of magnetized elements and said second plurality of magnetized elements being rotatable about its respective axis relative to the other of said first plurality of magnetized elements and said second plurality of magnetized elements when said magnetic fields are brought together to interact.

10. The device of claim 9 wherein said magnetized elements of one of said first plurality and said second plurality are angularly adjustable relative to their respective said plane between a first position wherein said surfaces are peripherally aligned to minimize the magnetic field characteristics and a second position wherein said surfaces have maximum exposure of said first and second portions to maximize the magnetic field characteristics, thereby varying the degree of interaction between said magnetic fields.

11. The device of claim 10 wherein both said first plurality of magnetized elements and said second plurality of magnetized elements are angularly adjustable relative to their respective said planes between respective said first positions and respective said second positions.

12. The device of claim 9 wherein said magnetized elements of both said first plurality and said second plurality are adjustable to change their respective sides of exposure relative to their respective said planes of respective said first portions and respective said second portions to reverse the polarity of their respective said magnetic fields, thereby reversing the direction of rotation.

13. The device of claim 9 wherein said surfaces of said first plurality of magnetized elements are in abutting engagement with each other, and said surfaces of said second plurality of magnetized elements are in abutting engagement with each other.

14. The device of claim 9 further including other ones of said first plurality of magnetized elements alternately disposed between other ones of said second plurality of magnetized elements.

* * * * *